United States Patent [19]

Blomberg et al.

[11] Patent Number: 4,635,031
[45] Date of Patent: Jan. 6, 1987

[54] ELECTRONIC WHEEL SLIP SENSOR FOR VEHICLE BRAKE SYSTEMS

[76] Inventors: Folke I. Blomberg, Duvstigen 4, S-181 40 Lindingo; Jan-Olov M. Holst, Skogsduvevagen 14, S-752 52 Uppsala, both of Sweden

[21] Appl. No.: 667,210

[22] Filed: Nov. 1, 1984

[30] Foreign Application Priority Data

Nov. 1, 1983 [SE] Sweden ............................ 8306000

[51] Int. Cl.⁴ .......................... B60Q 1/00; B60T 8/72
[52] U.S. Cl. ............................ 340/52 R; 340/52 B; 340/669; 340/672; 180/197; 303/94; 303/96; 303/98
[58] Field of Search ................ 340/52 R, 52 B, 52 C, 340/670–672, 669; 303/3, 15, 20, 91–98, 100, 104, 107; 180/197, 170, 219

[56] References Cited

U.S. PATENT DOCUMENTS

| | | | |
|---|---|---|---|
| 3,776,357 | 12/1973 | Arai et al. | 180/197 |
| 3,912,337 | 10/1975 | Ochiai | 303/21 P |
| 3,995,912 | 12/1976 | McNinch, Jr. et al. | 340/52 B |
| 4,233,599 | 11/1980 | Brearley | 340/672 |
| 4,347,569 | 8/1982 | Allen, Jr. et al. | 180/197 |
| 4,349,233 | 9/1982 | Bullard et al. | 180/197 |
| 4,410,947 | 10/1983 | Strong et al. | 180/197 |

FOREIGN PATENT DOCUMENTS 1204266  9/1970  United Kingdom .
1463893  2/1977  United Kingdom .

*Primary Examiner*—Donnie L. Crosland
*Attorney, Agent, or Firm*—Daniel E. McConnell

[57] ABSTRACT

This invention relates to an electronic sensor for determining the start time and duration of the brake relief phase in brake force modulation cycles in vehicles with so-called anti-lock brake systems. A tachometer detects the rotation speed of the wheels. A signal from the tachometer is compared to a reference signal from a reference value generator. A switch is controlled by an output signal from the comparator and in turn controls a brake force reduction operation of a brake force modulator. The slope of the reference signal may be controlled by a vehicle operating condition such as the modulated brake force.

15 Claims, 9 Drawing Figures

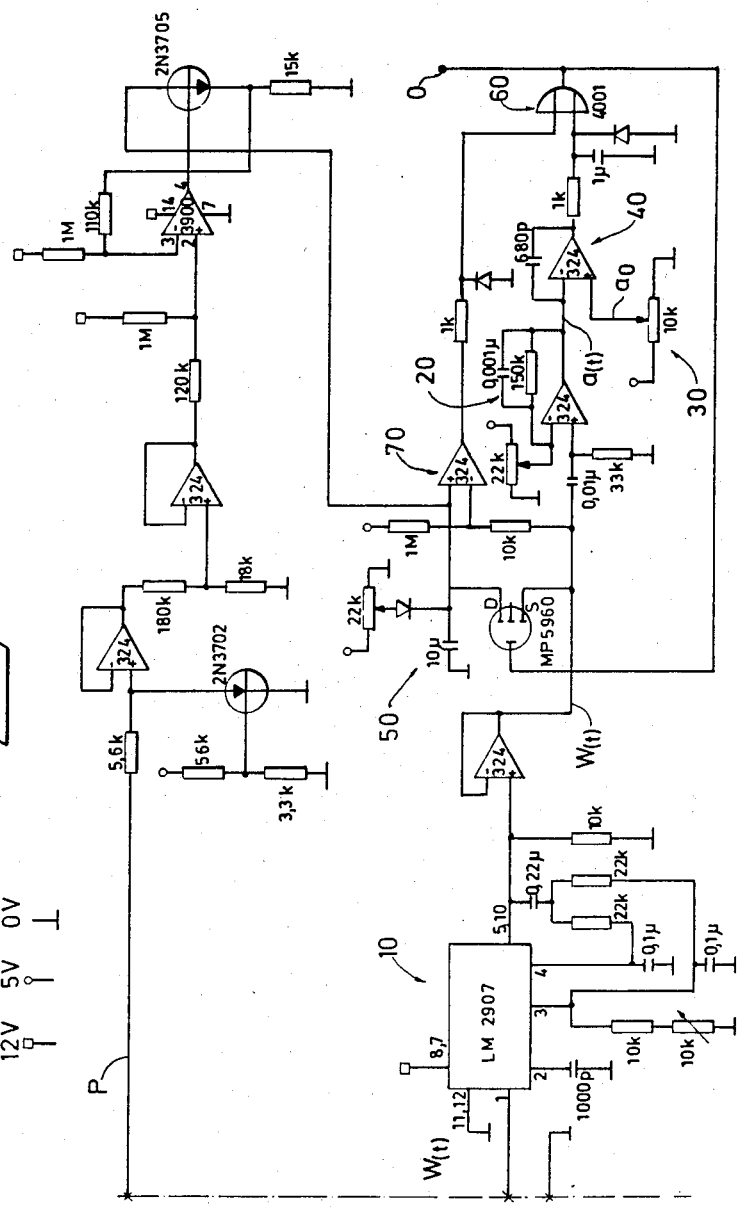

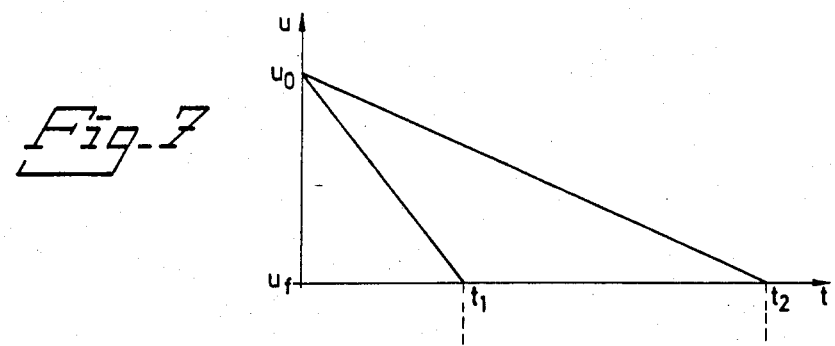
Fig_7
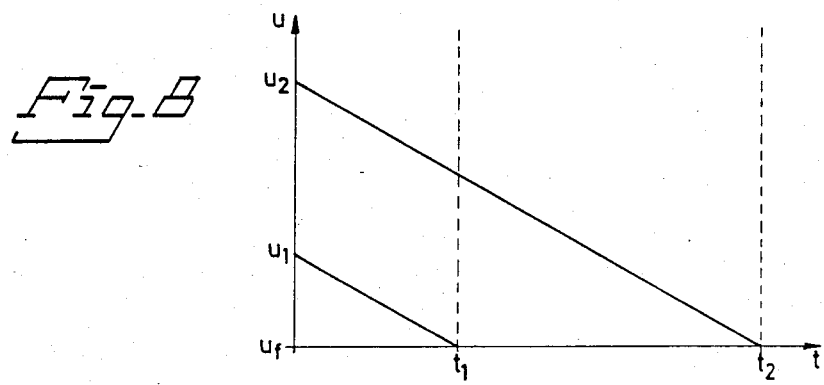
Fig_8
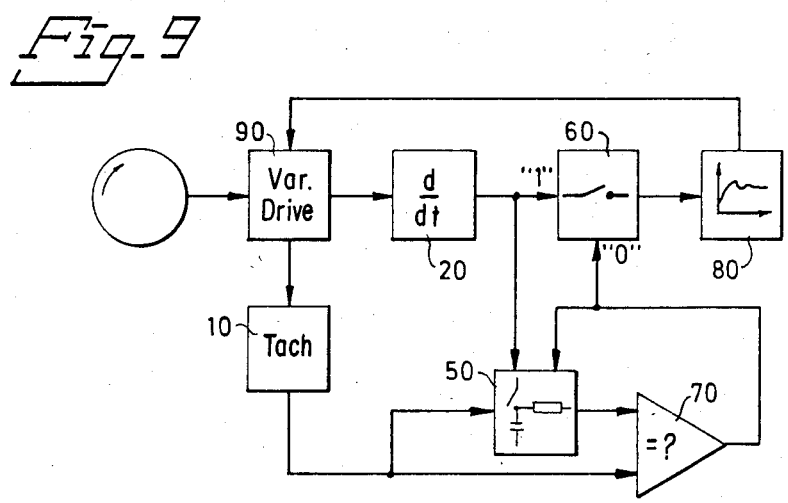
Fig_9

ELECTRONIC WHEEL SLIP SENSOR FOR VEHICLE BRAKE SYSTEMS

FIELD AND BACKGROUND OF INVENTION

The present invention relates to an electronic sensor for brake systems in vehicles, in particular to an electronic sensor for vehicles with so-called anti-lock brake systems. As is well-known, the braking force in such brake systems is modulated when brakes are applied too strongly and there is a risk that the wheel slip (the ratio between the peripheral velocity of the wheel and the vehicle velocity) increases to such an extent that reduced braking efficiency and ability to exert lateral force cause loss of control of the vehicle.

A large number of wheel sensors have been developed, many of which use digital electronic techniques and similar control philosophies. A common, and dominating, problem is to find a reasonable solution to the requirement that the sensor receive information regarding the momentarily prevailing frictional condition between the vehicle wheels and a road surface. In previously known sensors this is accomplished by a continuous calculation of the retardation and acceleration of the wheel with the aid of a microcomputer in which are stored reference values to which the retardation is continuously compared. On the basis of these comparisons, the sensor provides a series of different signals instructing the brake force modulator of the system to reduce the brake force, to hold it constant or to re-apply the brake force with different application rates depending on the values of the calculated wheel accelerations. The known sensors generally comprise a quartz clock that continuously provides a pulse train of high frequency, for instance one pulse each fifth millisecond. The sensor provides signals with a duration comprising multiples of 5 milliseconds, which is the basis for the ability of the sensors to provide, depending on the calculated retardations and accelerations, instructions to the brake force modulator and, during a certain number of periods of for instance 5 milliseconds, to reduce, hold constant, or re-apply brake force.

In this way the sensor can be made to provide a signal pattern that adapts the brake modulator's control of the brake force to the momentarily prevailing state of the road in an acceptable way. While such a sensor will operate acceptably, such a complex control system can only be accomplished with modern, very advanced microelectronics of superior component quality, such as that known to experts in the field as "military specified".

Such sensors are very expensive and sensitive to functional disturbances due to their complexity and sensitivity to external disturbances. The remaining electrical systems of the vehicle are a disturbing interference source which can be reasonably protected against by interference surpressing measures on the vehicle. External interference sources over which the vehicle manufacturer has no control, for instance in the form of other vehicles, traffic-lights, welding machines, radar and TV equipment, power transmission lines, thunderstorms and the extremely high and low temperatures that have to be considered in vehicle environments, are much harder to deal with. Further negative cost and reliability factors for such complex systems are that the accompanying complex brake force modulator and extensive cabling introduce an interference threat per se by "antenna action".

BRIEF DESCRIPTION OF INVENTION

With the foregoing discussion in mind, it is an object of this invention to provide much simpler, more inexpensive and reliable electronic wheel sensors by having the sensor provide only a single type of signal instructing the brake force modulator to lower the pressure. When the signal ends, the brake force is reapplied. The sensor is provided with an artificial speed reference curve, the value and slope of which are controlled, respectively, by the modulated brake force and in certain circumstances also by the vehicle load.

Sensors based on this principle are very simple compared to previously known electronic sensors and experience has shown that requirements as regards precision for sensors of this kind are much lower than for previously known sensors. If digital, they can be based on very simple microcomputer technology using moderately advanced components which are relatively insensitive to interference. It is even possible to build sensors that are analog, in which case it is possible to use such high voltage and current levels that they become insensitive to external interference sources.

Thus, the present invention is intended to remove the problems mentioned above and to provide a simple, inexpensive and very reliable electronic sensor.

BRIEF DESCRIPTION OF DRAWINGS

Some of the objects of the invention having been stated, other objects will appear as the description proceeds, when taken in connection with the accompanying drawings, in which:

FIG. 5 is a block diagram of a presently preferred embodiment of the electronic sensor in accordance with the present invention;

FIGS. 7 and 8 are two diagrams illustrating the operation of the sensor; and

FIG. 9 is a block diagram of an embodiment of the electronic sensor in accordance with the present invention which operates in accordance with of FIG. 8.

DETAILED DESCRIPTION OF INVENTION

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
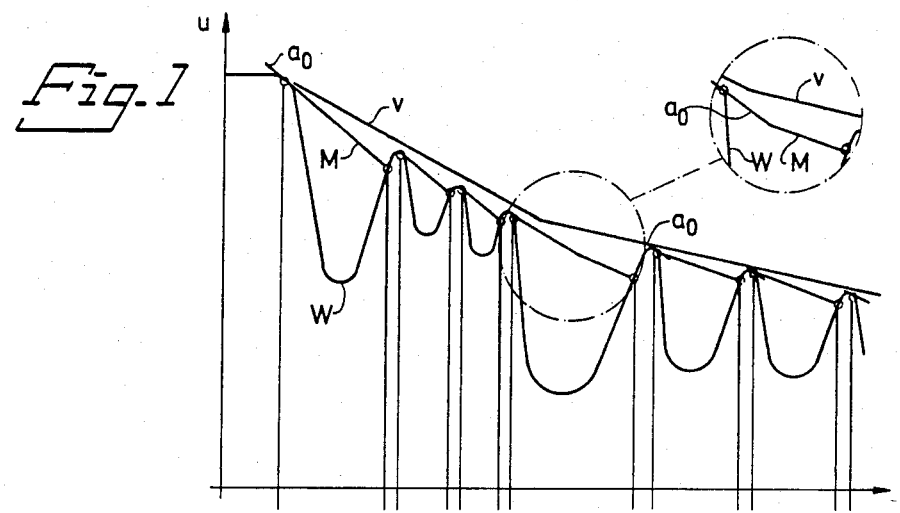
FIG. 1 is a speed-time diagram showing characteristic curves in connection with the deceleration of a vehicle having an anti-lock brake system.
Figure 2:
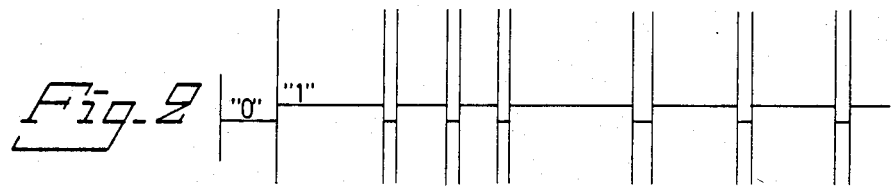
FIG. 2 is a diagram showing the on and off states of sensor switches during the deceleration of FIG. 1.
Figure 3:
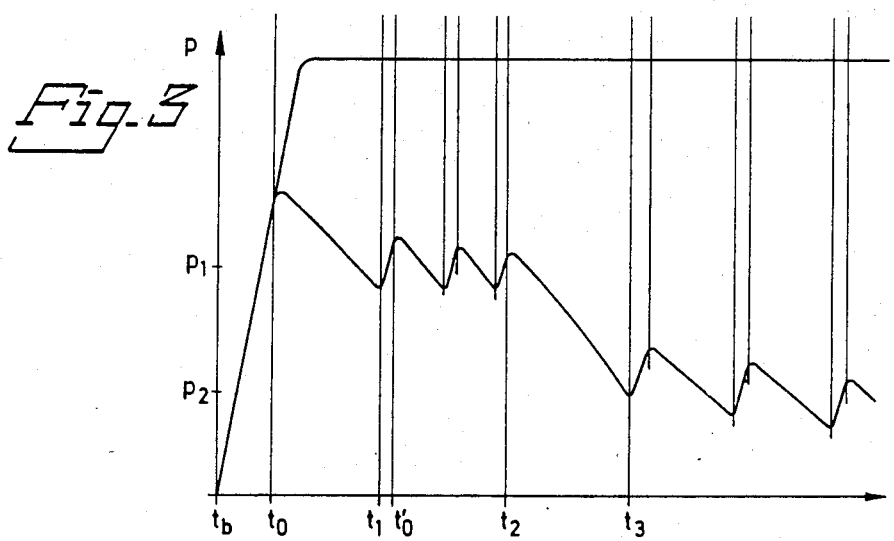
FIG. 3 illustrates the variations in the modulated brake force during the deceleration of FIG. 1.

FIGS. 1 through 3, read together, are a speedtime diagram of the deceleration of a vehicle and related events in the operation of a braking system. In FIG. 1, a curve v designates the vehicle speed and a lower curve w designates the wheel speed. It is assumed that a strong deceleration occurs at time t0 (FIG. 3). At time t0 the retardation of the vehicle wheel has reached a threshold value a0, which for instance can lie in the range of from about 0.3 g to about 1.5 g. This threshold value is represented in FIG. 1 by the tangent to curve w which illustrates the dependence of the wheel speed on time. Under these circumstances, retardation is usually expressed in the unit "g". One starts from the rectilinear retardation of the vehile and divides this by 9.81 m/s2 whereby the retardation is expressed in the unit "g". In order to normalize the wheel retardation in a similar way, one first calculates the peripheral retardation of the wheel from the angular retardation and the wheel radius and then divides by 9.81 m/s2. Thus calculated, the wheel retardation and the vehicle retardation can be compared directly.

Before time t0 the modulated brake force rises in accordance with the curve in FIG. 3. During this period the sensor provides an output signal "0" as shown in FIG. 2. At time t0 the sensor is activated and provides an output signal "1". (It is appreciated that designations "0" and "1" do not have any other meaning than to indicate switched-off and switched-on position, respectively, and that so-called inverted logic where logical "1" represents the switched-off position and logical "0" represents the switched-on position is also possible.) This starts a reduction of the modulated brake force as is shown in the lower curve in FIG. 3. During this brake force reduction phase the wheels get an opportunity to recover and reach such a speed that the wheel slip again reaches acceptable values. Curve M in FIG. 1 is a reference retardation for the wheels that fulfills this requirement and represents an acceptable value for wheel slip. For this reason the wheel speed in accordance with the lower curve w is compared to this reference curve M, and at time t1 the actual wheel speed coincides with the reference speed. When this occurs the brake force reduction is interrupted. Thus, when the sensor in accordance with the present invention has sensed agreement between the actual wheel speed and the reference velocity a "0"-signal is provided (FIG. 2), which switches-off the brake force reduction. The modulated brake force will once again rise, and at time t'0, the threshold retardation a0 of the wheel is once again exceeded and the above process is repeated. In this way the modulated brake force will alternately decrease and increase until the threshold retardation a0 is no longer exceeded. This process is designated brake force modulation. The problem addressed and solved by the present invention is that of determining how fast the reference speed M can be allowed to decrease. In accordance with this invention, the reference speed curve M should depend on the road conditions, that is the coefficient of friction u. Thus, it is not always suitable during braking with bad road conditions, for instance ice, to let the curve M drop as fact as during braking with good road conditions, for instance dry asphalt. This fact has been illustrated in FIG. 1 by letting the three first brake force modulation cycles show reference curves M that decrease faster with time than the corresponding reference curves in the three last cycles. The deceleration that is illustrated in FIG. 1 is thus started during good road conditions. Thus, the slope of curve M should depend on the coefficient of friction u between the wheels and the road surface. Since the coefficient of friction u varies between 1.0 (dry asphalt) all the way down to 0.1 or even 0.05 (glassy ice) it is the object of the present invention to assure that the slope of curve M at each instant in time is correlated to the coefficient of friction.

Thus, the problem that the sensor in accordance with the present invention has to solve is to in some way account for the coefficient of friction u between the wheels and the road surface in the determination of the slope of reference curve M. If this is not done the switch-off time t1 can be incorrect and this can reduce the braking efficiency and the stability of the vehicle.

Theoretical considerations and practical tests have shown that a suitable parameter for the determination of the slope of curve M is the modulated brake force. This force varies in the three first brake force modulation cycles of FIG. 1 (good road condition) around the average value P1 (FIG. 3), while the corresponding force in the three last brake force modulation cycles of FIG. 1 (poor road condition) varies around the lower average value P2 (FIG. 3). Thus, if the modulated brake force is detected it is possible to determine a suitable slope of curve M therewith. A higher brake force gives a reference curve M that decreases faster with time and vice versa.

The fact that reference curve M is adapted to the present road conditions has been illustrated in FIG. 1 in the encircled fourth brake force reduction phase. This phase corresponds to the transition from good road conditions to poor road conditions. During this phase the slope of reference curve M changes from corresponding essentially to the slope of the high u surface in the preceding brake force reduction phase to essentially corresponding to the slope of the low u surface in the next brake force reduction phase. It should be noted that the time scale and the slope change have been strongly exaggerated in FIG. 1 for the sake of clarity. Furthermore, it is appreciated that the slope of reference curve M also can vary slightly in the remaining cyles in FIG. 1, but that these variations are significantly smaller, since the vehicle in this case is on a fairly homogeneous surface. Thus, the changes in slope are largest during transitions between different types of road conditions.

The adaptation of the slope of reference curve M to road conditions as described above can be done either continuously (as is shown in the encircled fourth cycle in FIG. 1) or discontinuously as is shown in the supplementary view enclosed within a broken line circle in the upper right corner of FIG. 1. The discontinuous adaptation of the slope of the reference curve can be done in one or several steps.

In the description above the threshold retardation a0 has been considered as a predetermined constant threshold value. This is the simplest embodiment of the invention. In a more sophisticated embodiment of the invention, however, the threshold retardation a0 is influenced by the coefficient of friction u between the wheels and the road surface in a way similar to the slope of reference curve M. This means that the threshold retardation a0 will be lower during worse road conditions, which means that the brake force reduction will be started earlier.

Figure 4:
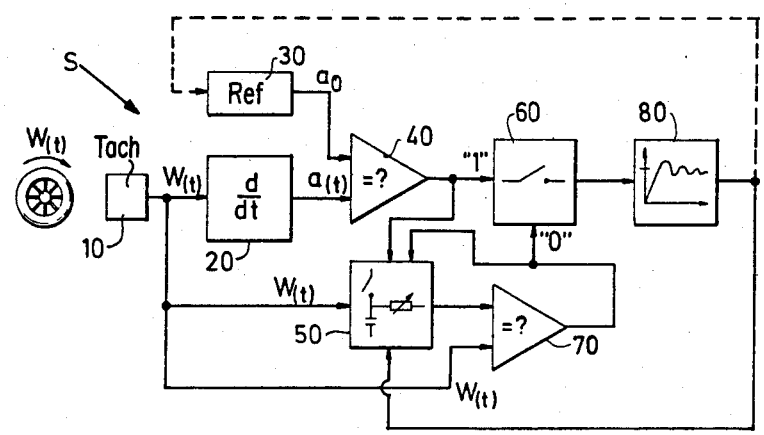
FIG. 4 is a block diagram of an electronic sensor in accordance with the present invention.

The block diagram of FIG. 4 illustrates how the above principles can be realized in an embodiment of an electronic sensor in accordance with the present invention. The sensor S comprises a tachometer 10 that measures the wheel speed and provides a signal w(t) representing the wheel speed. In this connection the word "tachometer" refers to any suitable device for detecting the wheel speed and providing a signal representing this speed. As examples of suitable devices can be mentioned frequency-voltage transducers that sense the rotation frequency of the wheel either mechanically, optically or magnetically. Suitable devices comprise for instance signal generators that provide a voltage proportional to the wheel rotation, for instance a D.C. voltage generator or an A.C. voltage generator with corresponding rectifier. Even such simple generators as conventional one-phase bicycle generators are useful. Furthermore, as suitable sensors one can mention pulse generators with frequency-voltage transducers, for instance of type LM 2908. A number of combinations are given below:

1. Optical yoke plus toothed wheel plus LM 2907.
2. Inductive transducer plus toothed wheel plus LM 2908 ("magnetic pick up").
3. Magnetic wheel plus Hall-element plus LM 2908.
4. Magnetically biased Hall-element (magnet behind Hall-element) plus toothed wheel plus LM 2907.
5. Magnet with a plurality of poles, each second pole being a north pole and each other second pole being a south pole or two magnets with different strength that pass by a coil in which current is induced plus LM 2907.
6. "Wiegand wire" plus two permanent magnets plus induction coil plus LM 2907.
7. Permanent magnets plus tung element plus LM 2907.
8. A.C. voltage generator plus LM 2907.
9. Quartz crystal plus toothed wheel plus integrated circuit that gives a current that is inversely proportional to the frequency.

If the sensor is made digital and microcomputer-controlled the pulse train should preferably not be transformed into voltage. Instead the pulses are used directly. From the above description it is appreciated that the essential feature of tachometer 10 is that it provides a signal that in some way represents the wheel speed.

The signal w(t) is led to a differentiating circuit 20, which in turn provides a signal corresponding to the derivative with respect to time of the velocity, that is the acceleration a(t). One example of a differentiating circuit is an operational amplifier (for instance LM 324) and a capacitor, used in an analog version of a sensor in accordance with this invention. If the sensor S is made in a digital, microcomputer-controlled form the differentiating circuit 20 preferably comprises a device or system that counts pulses and compares the number of pulses counted in successive time intervals.

The output signal a(t) from the differentiating circuit 20 is applied to one input of a comparator 40. This can for instance comprise an operational amplifier (for instance LM 324). In an analog version of the sensor in accordance with the invention, voltages are compared in the comparator, while frequencies are compared in a digital version. The second input of the comparator is a signal a0 from a reference value generator 30. The reference signal a0 represents the threshold retardation of FIG. 1. When the acceleration signal a(t) reaches equality with the threshold value a0 the output of the comparator 40 is activated to logical level "1" in order to start a brake force reduction phase. The threshold retardation a0 is preferably represented by a voltage in an analog version of the sensor in accordance with the invention and by a frequency in a digital version. The cases below are of special interest:

1. a0 is constant for all situations and independent of the road conditions and the form of reference curve M.
2. a0 is constant for all situations and equal to the initial slope of reference curve M.
3. a0 has a designated predetermined initial value and is thereafter varied in accordance with the modulated brake force.

The output signal w(t) from tachometer 10 is also applied to a sampling circuit 50 that stores the instantaneous value of the velocity w(t). A suitable means for storing the instantaneous velocity w(t) in an analog sensor comprises for instance a capacitor. At time t0, that is when the acceleration signal a(t) equals a threshold value a0 and the comparator 40 outputs a logical signal "1", the sampling circuit 50 responds to the output signal from the comparator 40 to cut-off the signal supplied to the sampling circuit 50, so that the velocity signal w(t0) will be stored in the sampling circuit 50. The switching element can comprise for instance a field effect transistor. In other words the circuit 50 samples the signal w(t0).

The output signal from comparator 40 triggers a switch 60, for instance a field effect transistor or a bipolar transistor, which in turn activates the brake force modulator 80 for a brake force reduction phase. The duration of the brake force reduction phase is determined by the time it takes for the wheel to "recover" and accelerate to an acceptable velocity. This acceptable velocity or reference velocity is represented by curve M in FIG. 1. Such a reference curve can be obtained from the sampling circuit 50 by discharging the stored signal at a suitable discharge rate. Thus, in a very simple embodiment the voltage stored in a capacitor, which represents the velocity w(t0), is discharged through a resistor of a suitable value. A signal that represents reference curve M is obtained from the resistor. If the output voltage is referred to a fairly large negative potential one obtains an approximately rectilinear discharge curve. Alternatively the capacitor can be discharged with a current that is proportional to the modulated brake force, as is shown in the embodiment of FIG. 5.

In a digital, preferably microcomputer-controlled, version of the electronic sensor in accordance with the present invention, the reference curve can be generated in the form of a decreasing stepped curve. This curve can be generated for instance by a crystal-controlled voltage generator which periodically reduces a predetermined initial voltage. The reduction may proceed in one of two ways, namely by varying the incremental change in voltage, and by varying the increment of time during which each voltage level is maintained. In the first mentioned approach, the size of the steps is determined by the applied brake force. Alternatively, the voltage generator can step down the voltage in uniform steps, in which case the time period for each step is varied in accordance with the modulated brake force.

The output signal from the reference and sampling circuit 50 is applied to a second comparator 70 and is compared to the velocity signal w(t) from tachometer 10. In an analog version of the sensor the comparator 70 can comprise an operational amplifier, for instance a type LM 324, in which case voltages are compared. In a digital version of the sensor, it can comprise a frequency comparator. When the tachometer signal w(t) reaches the reference signal, the comparator outputs a logical "0" signal which marks the end of the brake force reduction phase. This logical signal "0" is applied to the switch 60, which in turn controls the brake force modulator 80 to end the brake force reduction cycle, and the sampling circuit 50 so that the input signal w(t) once again can be applied thereto.

As has been mentioned above, the slope of reference curve M in FIG. 1 should depend on the coefficient of friction u between the wheels and the road surface. Tests have shown that the coefficient of friction can be represented by the modulated brake force. The modulated brake force can be sensed for instance by letting pistons and springs control resistors or capacitors. It is also possible to mechanically sense torques or forces in links and by mechanical movement or strain pickups generate current or voltage proportional to the modulated brake force. Thus, in this way it is possible to feedback a signal indicative of the magnitude of the coefficient of friction to reference circuit 50. This feedback has for sake of simplicity in FIG. 4 been represented by a vairable resistor in block 50. By varying the resistance of the resistor a variable discharge rate and therefore a variable slope of curve M in FIG. 1 is obtained. In a preferred embodiment, the capacitor memory is discharged with a current that is proportional to the modulated brake pressure.

As has been mentioned above the threshold retardation a0 can also be made dependent on the coefficient of friction u between the wheels and the road surface in a way similar to the reference curve M. In FIG. 4 this has been indicated with a dashed line indicating feedback from the brake force modulator 80 to the reference value generator 30.

Thus, with the sensor S described above it is possible by sensing the rotation speed of the wheel and by sensing the modulated brake force to determine on the one hand when a brake force reduction phase shall be started and on the other hand when this phase shall be ended in correlation with the coefficient of friction u between the wheels and the road surface. The modulated brake force has been suggested above as a suitable parameter for establishing this correlation. In a mechanical system this parameter can be directly represented by the brake force itself, but in a pneumatic or hydraulic system it can also be represented by the modulated brake pressure.

Another parameter that can be of interest in determining the reference curve M and the threshold retardation a0 is the wheel load. As is known, a heavily loaded vehicle has better brake efficiency than an unloaded vehicle. For this reason also it can be preferable to sense the wheel load. For instance two potentiometers can be connected in series, one representing modulated brake force and one representing the wheel load. The total resistance of the potentiometers will then represent a measure of a suitable slope of reference curve M and possibly also of the threshold retardation a0.

In the considerations above, one sensor S has been assumed for each wheel with modulated brake force. Naturally it is also possible that several wheels may be controlled by one sensor S. For instance, it is possible to measure the rotational speed of the cardan shaft instead of wheel speed. This makes it possible to control two rear wheels with a single sensor. It is also possible to control each wheel pair with one sensor. Alternatively, it is also possible in order to reduce the price to let four wheels be controlled by a single sensor. In this latter case one can let the average speed of the wheels be the basis for the signal processing.

FIG. 5 shows in greater detail a presently preferred practical embodiment of the electronic sensor of FIG. 4. In FIG. 5, the blocks of FIG. 4 have been indicated where possible. The input signal w(t) from a toothed wheel with corresponding optical yoke is supplied to a frequency-voltage transducer 10 based on the integrated circuit LM 2907. The output voltage obtained is differentiated in a differentiating unit 20 based on an operational amplifier. The differentiated voltage is compared in a comparator 40 to a reference value a0 from a potentiometer. The memory means in the unit 50 comprises a capacitor, and reference curve M is obtained by discharging this capacitor with a current proportional to the modulated brake force. The modulated brake force is fed back as a signal P to unit 50 with the aid of a pressure sensor, which in a preferred embodiment comprises a permanent magnet and a Hall-element, whereby the size of the discharge current and therefore the slope of reference curve M can be varied. The magnetic part of the pressure sensor is attached to a spring-loaded piston in a cylinder that is connected to the brake cylinder and senses that modulated brake pressure. The distance between the permanent magnet and the Hall-element is proportional to the pressure and influences the output signal from the Hall-element in such a way that the discharge current of the memory and therefore the slope of the reference curve can be varied in the intended way.

In the sensor as it has been described to this point, the determination of the initial signal when a certain threshold value of the wheel retardation is exceeded is based on electronic differentiation, which is a relatively complex operation.

However, for decades there have existed a large number of reliable, simple and inexpensive mechanical devices that provide a signal when rotational retardation threshold values are exceeded. A well-known such device is the "Maxaret" that has been used in anti-lock brake systems for airplanes since the 1940's. Such devices are generally based on a flywheel that can move a small angle in relation to the axis on which the wheel is mounted. The flywheel is spring-biased against a stop on the axis in a direction opposite to the rotational direction. If the flywheel is retarded with a rate of retardation that is greater than the retardation that corresponds to the moment of inertia of the flywheel and the spring load, the flywheel will turn a small angle. This movement can be used to close a switch. The spring load and the moment of inertia of the flywheel can be said to give a reference value corresponding to reference value a0 above.

Figure 6:
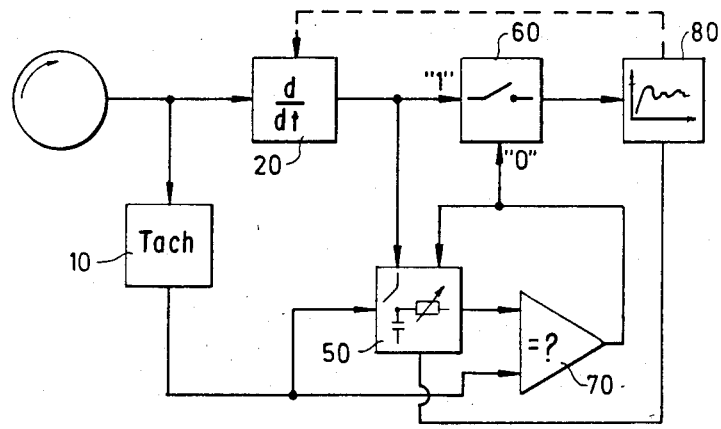
FIG. 6 is a block diagram of an alternate embodiment of an electronic sensor in accordance with the present invention.

In order to avoid problems related to electronic differentiation certain electronic components in the electronic sensor in accordance with the invention can be replaced by a mechanical retardation sensor as described above. A block diagram of such an embodiment is shown in FIG. 6, where the mechanical retardation sensor is represented by block 20. The flywheel with its spring and switch in principle replace blocks 20, 30 and 40 in the embodiment of FIG. 4. The remaining elements in the embodiment of FIG. 6 can in principle be the same as in the embodiment of FIG. 4. For this reason the different blocks in FIG. 6 bear the same reference designations as in the embodiment of FIG. 4.

The dashed line in FIG. 6 designates a feedback of the modulated brake force to the reference value generator for the threshold retardation a0. Such a feedback can be obtained for instance by letting one attachment point of the spring be displaced as a function of the modulated brake force.

Another way to avoid the potential problems related to electronic differentiation is to remove this step entirely from the process. In such an embodiment, the speed and not the deceleration is used to initiate the reference curve M. The principle is the following: As soon as a brake force is applied a reference speed curve M is started. The slope of this reference curve depends on the applied brake force and represents a limit for the wheel speed reduction which can be allowed without any tendencies to sliding. This reference speed is compared to the wheel speed w. As soon as the wheel speed w falls below the reference speed, which means that the coefficient of friction between wheel and road surface is lower than the value corresponding to the applied brake force, the sensor acts to start a brake relief phase. In the brake relief phase it is the modulated brake force which governs the speed reference curve M. As soon as the wheel speed w again reaches and exceeds the reference speed M the sensor acts to end the brake relief phase. Thus, in this embodiment there is no need for a differentiation of the wheel speed signal, since there is no need to compare such a differentiated signal with a reference deceleration a0 in order to determine when to start a brake relief phase.

FIG. 7 schematically illustrates the reference curve M during a brake force reduction phase. The two curves in the Figure start at the same initial speed u0 and reach the same final speed uf after time t1 and t2, respectively. The curve with the steeper slope corresponds to good road conditions (for instance the three first cycles in FIG. 1), while the curve with the flatter slope corresponds to worse road conditions (for instance the three last cycles in FIG. 1). This circumstance can be expressed by saying that with the same initial speed for the vehicle but different road conditions the reference curve M will require different time periods to reach the final velocity uf. In FIG. 7 this result is obtained by letting the reference curves have different slopes.

Another way to obtain the same result is to let the reference curves M have the same slope, but different initial speeds. An example illustrating this is shown in FIG. 8. In FIG. 8 the lower curve from the initial speed u1 has reached the final speed uf in time t1, while the upper curve from the initial speed u2 has reached the final speed uf in time t2. Instead of letting the two curves have the same initial velocity and different slopes, as in FIG. 7, the curves of FIG. 8 thus have the same slope but different initial speeds. The two views lead to the same end result, namely that the final speed uf for one curve is reached after time t1 while the final velocity uf for the other curve is reached after time t2.

The equivalent result achieved by operation in accordance with FIGS. 7 and 8 can be utilized in the electronic sensor in accordance with the present invention. An embodiment utilizing this equivalence is shown in FIG. 9. In the embodiment of FIG. 9 wheel speed is not measured directly, but is applied to a variable drive 90. This variable drive has the purpose of gearing up or down the wheel speed in correlation with the modulated brake force (road condition). Instead of measuring the wheel rotation directly, the sensor now measures the output of the variable drive. Thus, one "cheats" the sensor into believing that the output speed of the drive is the rotation speed of the wheel. Since the feedback from the modulator now is to the variable drive, the discharge of the memory can be done at a constant rate (reference curve M has the same slope in all road conditions). This has been indicated in FIG. 9 by replacing the variable resistor in unit 50 with a fixed resistor.

Block 20 in FIG. 9 can comprise the same type of mechanical retardation sensor as in the embodiment of FIG. 6 and the remaining elements can be of the same type as in embodiment of FIG. 4.

Another possibility is to insert a variable drive between the wheel and the tachometer 10 in the embodiment of FIG. 4. The feedback from the modulator 80 to the sampling and reference unit 50 is then directed the variable drive and the reference unit 50 is discharged at a constant rate.

In the drawings and specifications there has been set forth preferred embodiments of the invention and, although specific terms are used, the description thus given uses terminology in a generic and descriptive sense only and not for purposes of limitation.

What we claim is:

1. An electronic sensor for responding to the rate of change of changing rotational speeds of a vehicle wheel which is coupled with a brake including a braking force modulator for subjecting the vehicle wheel to modulated braking forces and comprising:

tachometer means operatively connected to the vehicle wheel and responsive to vehicle wheel rotation for generating an electrical speed signal indicative of the rotational speed of the vehicle wheel, threshold means operatively coupled to said tachometer means and responsive to vehicle wheel rotation for generating an electrical excessive rate signal indicative of occurrences of an excessive rate of change in changing rotational speeds of the vehicle wheel, reference means electrically connected with said threshold and tachometer means for receiving electrical signals therefrom and for generating a changing electrical reference signal indicative of an acceptable rate of change in changing rotational speeds of the vehicle wheel, means operatively associated with the vehicle for responding to variations in vehicle operating conditions and with said reference means for varying the rate of change of said reference signal in predetermined relation to variations in vehicle operating conditions, comparator means electrically connected with said tachometer means and reference means for receiving electrical signals therefrom and for comparing the speed and reference signals and for generating a logic signal indicative of the relation of the speed and reference signals, and electrical switching means electrically connected with said threshold means and comparator means for receiving electrical signals therefrom and for generating an electrical output signal for transmission to the braking force modulator and indicative of a brake relief phase of modulation of braking force.

2. An electronic sensor for responding to the rate of change of changing rotational speeds of a vehicle wheel which is coupled with a brake including a braking force modulator for subjecting the vehicle wheel to modulated braking forces and comprising:

tachometer means operatively connected to the vehicle wheel and responsive to vehicle wheel rotation for generating an electrical speed signal indicative of the rotational speed of the vehicle wheel, threshold means operatively coupled to said tachometer means and responsive to vehicle wheel rotation for generating an electrical excessive rate signal indicative of occurrences of an excessive rate of change in changing rotational speeds of the vehicle wheel, reference means electrically connected with said threshold and tachometer means for receiving electrical signals therefrom and for generating a changing electrical reference signal indicative of an acceptable rate of change in changing rotational speeds of the vehicle wheel, means operatively associated with the brake for responding to variations in the modulated braking force and with said reference means for varying the rate of change of said reference signal in predetermined relation to variations in modulated braking force, comparator means electrically connected with said tachometer means and reference means for receiving electrical signals therefrom and for comparing the speed and reference signals and for generating a logic signal indicative of the relation of the speed and reference signals, and electrical switching means electrically connected with said threshold means and comparator means for receiving electrical signals therefrom and for generating an electrical output signal for transmission to the braking force modulator and indicative of a brake relief phase of modulation of braking force.

3. An electronic sensor according to one of claims 1 or 2 wherein said means operatively associated with said reference means for varying the rate of change of said reference signal comprises a variable ratio transmission coupling means operatively interposed between the vehicle wheel and said tachometer means and between the vehicle wheel and said threshold means for varying the corelation between wheel rotational speed and sensed rotational speed in accordance with variance in vehicle operating conditions.

4. An electronic sensor according to claim 3 wherein said coupling means is responsive to modulated braking force.

5. An electronic sensor according to claim 3 wherein said coupling means is responsive to vehicle load.

6. An electronic sensor according to claim 3 wherein said coupling means is responsive to modulated braking force and vehicle load.

7. An electronic sensor according to one of claims 1 or 2 wherein said means operatively associated with said reference means for varying the rate of change of said reference signal comprises means for cyclically decreasing the initial value of said generated reference signal in corelation with cycles of operation of the braking force modulator.

8. An electronic sensor according to one of claims 1 or 2 wherein said means operatively associated with said reference means for varying the rate of change of said reference signal comprises means for varying the rate of decrease of said generated reference signal in corelation with modulated braking force and during a cycle of operation of the braking force modulator.

9. An electronic sensor according to one of claims 1 or 2 wherein said reference means comprises capacitor means for accepting an electrical charge indicative of the magnitude of said speed signal.

10. An electrical sensor according to claim 9 further comprising control means electrically connected to said capacitor means for controlling the rate of discharge of said capacitor means and further wherein said control means comprises a variable resistance means operatively responsive to variations in vehicle operating conditions for varying the rate of discharge of said capacitor means in accordance with variations in vehicle operating conditions.

11. An electronic sensor according to claim 10 wherein said variable resistance means is operatively responsive to modulated braking force.

12. An electronic sensor according to claim 9 further comprising control means electrically connected to said capacitor means for controlling the rate of discharge of said capacitor means and further wherein said control means comprises current limiting means for varying the rate of discharge of said capacitor means.

13. An electronic sensor according to claim 12 wherein said current limiting means is operatively responsive to variations in vehicle operating conditions for varying the rate of discharge of said capacitor means in accordance therewith.

14. An electronic sensor according to one of claims 1 or 2 wherein said threshold means comprises mechanical retardation sensing means having a flyweight coupleable for rotation in response to wheel rotation and selectively decoupleable in response to exertion on the flyweight of a torque having a magnitude greater than a threshold magnitude due to a change in rotational speed of the wheel.

15. A braking system for an automotive vehicle comprising a vehicle wheel, a fluid pressure actuated brake coupled with said wheel for exerting braking force thereon, a braking force modulator operatively associated with said brake for subjecting said wheel to modulated braking forces, and an electronic sensor for controlling operation of said modulator and for responding to the rate of change of changing rotational speeds of said wheel, said sensor comprising:

tachometer means operatively connected to said wheel and responsive to wheel rotation for generating an electrical speed signal indicative of the rotational speed of said wheel, threshold means operatively coupled to said tachometer means and responsive to wheel rotation for generating an electrical excessive rate signal indicative of occurrences of an excessive rate of change in changing rotational speeds of said wheel, reference means electrically connected with said threshold and tachometer means for receiving electrical signals therefrom and for generating a changing electrical reference signal indicative of an acceptable rate of change in changing rotational speeds of said wheel, means operatively associated with said brake and said modulator for responding to variations in fluid pressure conditions and with said reference means for varying the rate of change of said reference signal in predetermined relation to variations in fluid pressure, comparator means electrically connected with said tachometer means and reference means for receiving electrical signals therefrom and for comparing the speed and reference signals and for generating a logic signal indicative of the relation of the speed and reference signals, and electrical switching means electrically connected with said threshold means and comparator means for receiving electrical signals therefrom and for generating an electrical output signal for transmission to said modulator and indicative of a brake relief phase of modulation of braking force.

* * * * *